United States Patent
Saka et al.

(10) Patent No.: US 8,005,266 B2
(45) Date of Patent: Aug. 23, 2011

(54) VEHICLE SURROUNDINGS MONITORING APPARATUS

(75) Inventors: Masakazu Saka, Wako (JP); Hiroyuki Koike, Wako (JP); Fuminori Taniguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1112 days.

(21) Appl. No.: 11/810,569

(22) Filed: Jun. 6, 2007

(65) Prior Publication Data

US 2007/0291987 A1 Dec. 20, 2007

(30) Foreign Application Priority Data

Jun. 16, 2006 (JP) ................................ 2006-167656

(51) Int. Cl.
*G06K 9/00* (2006.01)
*H04N 7/18* (2006.01)

(52) U.S. Cl. ........ 382/104; 382/195; 382/218; 382/224; 348/118; 348/148; 701/301

(58) Field of Classification Search .................. 382/104, 382/195, 218, 224; 348/118–120, 148, 149; 701/301
See application file for complete search history.

(56) References Cited

U.S. PATENT DOCUMENTS

| | | | | |
|---|---|---|---|---|
| 7,130,448 B2 * | 10/2006 | Nagaoka et al. | ............... | 382/104 |
| 7,233,233 B2 * | 6/2007 | Taniguchi et al. | ............ | 340/435 |
| 7,330,568 B2 * | 2/2008 | Nagaoka et al. | ............... | 382/104 |
| 7,388,476 B2 * | 6/2008 | Nagaoka et al. | ............... | 340/436 |
| 7,403,639 B2 * | 7/2008 | Nagaoka et al. | ............... | 382/104 |
| 7,436,982 B2 * | 10/2008 | Taniguchi et al. | ............ | 382/104 |
| 7,483,549 B2 * | 1/2009 | Nagaoka et al. | ............... | 382/104 |
| 7,515,737 B2 * | 4/2009 | Nagaoka et al. | ............... | 382/104 |
| 7,561,719 B2 * | 7/2009 | Nagaoka et al. | ............... | 382/103 |
| 7,925,050 B2 * | 4/2011 | Nagaoka et al. | ............... | 382/104 |
| 2003/0138133 A1 * | 7/2003 | Nagaoka et al. | ............... | 382/104 |
| 2004/0183906 A1 * | 9/2004 | Nagaoka et al. | ............... | 348/148 |
| 2005/0276447 A1 * | 12/2005 | Taniguchi et al. | ............ | 382/103 |

(Continued)

FOREIGN PATENT DOCUMENTS

JP 2004-303219 10/2004

(Continued)

*Primary Examiner* — Aaron Carter
(74) *Attorney, Agent, or Firm* — Carrier Blackman & Associates, P.C.; Joseph P. Carrier; William D. Blackman

(57) ABSTRACT

A vehicle surroundings monitoring apparatus capable of recognizing the type of object existing around a vehicle with accuracy. The vehicle surroundings monitoring apparatus includes a process unit, which extracts a first image portion HP_1 likely to be the head of an object and sets a reference mask area MASK_C including HP_1, a left-hand mask area MASK_L near the left side of the reference mask area MASK_C, and a right-hand mask area MASK_R near the right side of the reference mask area MASK_C, and a process unit which searches for a second image portion presumed to be a leg image within a lower search area AREA_3 when a difference between an average luminance AVE_C of the reference mask area MASK_C and an average luminance AVE_L of the left-hand mask area MASK_L or a difference between the average luminance AVE_C and an average luminance AVE_R of the right-hand mask area MASK_R is equal to or greater than a predetermined level and which recognizes that the object type is "pedestrian" in the case where a plurality of second image portions are detected.

6 Claims, 10 Drawing Sheets

U.S. PATENT DOCUMENTS

| | | | |
|---|---|---|---|
| 2005/0276450 A1* | 12/2005 | Taniguchi et al. | 382/104 |
| 2006/0115122 A1* | 6/2006 | Nagaoka et al. | 382/104 |
| 2006/0126896 A1* | 6/2006 | Nagaoka et al. | 382/103 |
| 2006/0126897 A1* | 6/2006 | Nagaoka et al. | 382/103 |
| 2006/0126898 A1* | 6/2006 | Nagaoka et al. | 382/103 |
| 2006/0126899 A1* | 6/2006 | Nagaoka et al. | 382/103 |

FOREIGN PATENT DOCUMENTS

| | | |
|---|---|---|
| JP | 2005-276084 | 10/2005 |
| JP | 2006-101384 | 4/2006 |

* cited by examiner

VEHICLE SURROUNDINGS MONITORING APPARATUS

BACKGROUND OF THE INVENTION

1. Field of the Invention

The present invention relates to a vehicle surroundings monitoring apparatus which determines the type of object existing around a vehicle based on an image obtained by a camera mounted on the vehicle.

2. Description of the Related Art

Conventionally, there has been suggested a vehicle surroundings monitoring apparatus which extracts an image portion likely to be an image of a pedestrian's head from an image of the surroundings of the vehicle captured by an infrared camera mounted on the vehicle and determines whether the type of object in the real space corresponding to the image portion is "pedestrian" according to determination conditions of a luminance of the image portion, a distance between a real space position corresponding to the image portion and the vehicle, and the like (for example, refer to Japanese publication of unexamined patent application No. 2004-303219).

The present inventors, however, found that, if an infrared camera captures a plurality of pedestrians close to each other around the vehicle, an image portion is extracted which is likely to be an image of a pedestrian's head, and whether the type of object in the real space corresponding to the image portion is "pedestrian" is determined according to the determination conditions, then there is a case where the type of object is incorrectly determined to be other than "pedestrian" even though the object is pedestrians actually as a result of the determination.

The present invention has been provided in view of the above background. Therefore, it is an object of the present invention to provide a vehicle surroundings monitoring apparatus, a vehicle surroundings monitoring program, and a vehicle surroundings monitoring method capable of recognizing the type of object existing around the vehicle with accuracy.

SUMMARY OF THE INVENTION

The present invention has been provided to achieve the above object. According to one aspect of the present invention, there is provided a vehicle surroundings monitoring apparatus which monitors the surroundings of a vehicle by using an image captured by a camera mounted on the vehicle, comprising: a first image portion extraction process unit which extracts a first image portion likely to be an image of a first predetermined portion in a predetermined type of object in a real space from the captured image; a reference mask area setting process unit which sets a predetermined area including the first image portion as a reference mask area in the captured image; a lower search area setting process unit which sets a lower search area under the reference mask area in the captured image; a second image portion search process unit which searches for a second image portion having a preset feature value corresponding to a second predetermined portion in the predetermined type of object within the lower search area; and an object type determination process unit which determines the type of object in the real space corresponding to the first image portion according to whether the second image portion search process unit detects a plurality of the second image portions.

According to the vehicle surroundings monitoring apparatus of the present invention, the first image portion extraction process unit extracts the first image portion from the image captured by the camera and the second image portion search process unit searches for the second image portion within the lower search area. Then, the object type determination process unit determines the type of object in the real space corresponding to the first image portion according to whether the plurality of the second image portions are detected. In this manner, the type of object is determined on condition that the first image portion is extracted and that the plurality of the second image portions are detected under the first image portion. Thereby, it is possible to determine the type of object having the first image portion and the plurality of the second image portions located under the first image portion (for example, a pedestrian or an animal having a head and a plurality of symmetrical portions such as arms, shoulders, and legs under the head) with higher accuracy than in the case of determining the type based on only the first image portion when the object is captured by the camera.

Moreover, with these features, the predetermined type is "pedestrian" and the first predetermined portion is a pedestrian's head and that the object type determination process unit determines that the type of object in the real space corresponding to the first image portion is "pedestrian" when the second image portion search process unit detects the plurality of the second image portions.

In this invention, when a pedestrian is captured by the camera, the image of the pedestrian is supposed to be an image including a plurality of image portions formed by a pair of shoulders, arms, legs, and the like under the image portion of the head. Therefore, the second image portion search process unit searches for one pair of portions as the second predetermined portions. Thereby, it is possible to determine whether the type of object in the real space corresponding to the first image portion is "pedestrian" based on a feature peculiar to the image of the pedestrian with accuracy.

Furthermore, preferably the second predetermined portion is a pedestrian's leg. In this case, the leg, which is relatively large in shape and more likely to be captured together with the first image portion (the image portion of the head) in the captured image, is defined as the second predetermined portion. Thereby, the second image portion search process unit can easily detect the second image portion.

Moreover, preferably the vehicle surroundings monitoring apparatus further comprises a comparative mask area setting process unit which sets a left-hand mask area near the left side of the reference mask area and a right-hand mask area near the right side of the reference mask area in the captured image, wherein: the lower search area setting process unit sets the lower search area under the reference mask area, the left-hand mask area, and the right-hand mask area; the object type determination process unit determines that the type of object in the real space corresponding to the first image portion is "pedestrian" in the case where a luminance difference between the reference mask area and the left-hand mask area is equal to or greater than a first predetermined level and a luminance difference between the reference mask area and the right-hand mask area is equal to or greater than a second predetermined level; and the object type determination process unit causes the second image portion search process unit to search for the second image portion within the lower search area in the case where the luminance difference between the reference mask area and the left-hand mask area is smaller than the first predetermined level or in the case where the luminance difference between the reference mask area and the right-hand mask area is smaller than the second predetermined level and, in the case where a plurality of the second image portions are detected, it determines that the type of object in the real space corresponding to the first image portion is "pedestrian."

According to this invention, the object type determination process unit recognizes the object in the real space corresponding to the first image portion as a pedestrian in the case where the luminance difference between the reference mask area and the left-hand mask area is equal to or greater than the first predetermined level and that the luminance difference between the reference mask area and the right-hand mask area is equal to or greater than the second predetermined level (hereinafter, referred to as the first condition).

The first condition is used to extract the image portion of the pedestrian's head based on the feature that the image of the pedestrian's head differs from the background image in luminance in the captured image. In a situation where a plurality of pedestrians are close to each other, however, pedestrians' heads are included in the left-hand mask area and the right-hand mask area, respectively, in some cases. If so, the luminance difference between the reference mask area and the left-hand mask area or the right-hand mask area is small and therefore the first condition is not satisfied. Consequently, it is determined that the type of object in the real space corresponding to the first image portion is not "pedestrian" only based on the first condition.

Accordingly, unless the above condition is satisfied, the object type determination process unit causes the second image portion search process unit to search for the second image portion within the lower search area. If a plurality of the second image portions are detected, in other words, in the case where a plurality of image portions each having a feature value corresponding to the pedestrian's leg, the object type determination process unit recognizes the object in the real space corresponding to the first image portion as a pedestrian. This prevents a plurality of pedestrians from being incorrectly recognized as other than pedestrians in cases where they are close to each other around the vehicle, which improves the accuracy in recognition of pedestrians.

Furthermore, in the case where a luminance distribution in the reference mask area satisfies a predetermined condition, the object type determination process unit determines that the type of object in the real space corresponding to the first image portion is "pedestrian." Unless the luminance distribution in the reference mask area satisfies the predetermined condition, the object type determination process unit causes the second image portion search process unit to search for the second image portion within the lower search area. If a plurality of the second image portions are detected, the object type determination process unit determines that the type of object in the real space corresponding to the first image portion is "pedestrian."

According to this invention, the object type determination process unit determines that the object in the real space corresponding to the first image portion is a pedestrian in the case where the luminance distribution in the reference mask area satisfies the predetermined condition. The predetermined condition is set based on the luminance distribution of the pedestrian's head to be extracted. In a situation where a plurality of pedestrians are close to each other, however, the image portions of the pedestrians' heads are overlapping each other and causes the luminance distribution to be different from that of the head based on the predetermined condition in some cases. If the predetermined condition is not satisfied as a result of determination only based on the predetermined condition in this situation, the object in the real space corresponding to the first image portion is determined to be other than a pedestrian.

Therefore, unless the luminance distribution in the luminance mask area satisfies the predetermined condition, the object type determination process unit causes the second image portion search process unit to search for the second image portion within the lower search area. If the plurality of the second image portions are detected, in other words, in the case where the plurality of image portions each having the feature value according to the pedestrian's leg are detected, the object type determination process unit recognizes the object in the real space corresponding to the first image portion as a pedestrian. This prevents a plurality of pedestrians from being incorrectly recognized as other than pedestrians in cases where they are close to each other around the vehicle, which improves the accuracy in recognition of pedestrians.

Furthermore, preferably the vehicle surroundings monitoring apparatus further comprises: a real space distance recognition process unit which recognizes a distance between a real space position corresponding to the image portion included in the captured image and the vehicle; and a comparative mask area setting process unit which sets a left-hand mask area near the left side of the reference mask area and a right-hand mask area near the right side of the reference mask area in the captured image, wherein: the lower search area setting process unit sets the lower search area under the reference mask area, the left-hand mask area, and the right-hand mask area; the object type determination process unit determines that the type of object in the real space corresponding to the first image portion is "pedestrian" in the case where a difference between a reference distance, which is a distance between the real space position corresponding to the first image portion and the vehicle, and a left-hand comparative distance, which is a distance between the real space position corresponding to the image portion of the left-hand mask area and the vehicle, is equal to or greater than a first predetermined distance and in the case where a difference between the reference distance and a right-hand comparative distance, which is a distance between a real space position corresponding to the image portion of the right-hand mask area and the vehicle, is equal to or greater than a second predetermined distance; and the object type determination process unit causes the second image portion search process unit to search for the second image portion within the lower search area in the case where the difference between the reference distance and the left-hand comparative distance is smaller than the first predetermined distance or in the case where the difference between the reference distance and the right-hand comparative distance is smaller than the second predetermined distance and, in the case where a plurality of the second image portions are detected, it determines that the type of object in the real space corresponding to the first image portion is "pedestrian."

According to this invention, the object type determination process unit recognizes the object in the real space corresponding to the first image portion as a pedestrian in the case where the following condition (hereinafter, referred to as the second condition) is satisfied: the difference between the reference distance and the left-hand comparative distance is equal to or greater than the first predetermined distance and the difference between the reference distance and the right-hand comparative distance is equal to or greater than the second predetermined distance.

The second condition is used to extract the image of a pedestrian's head based on a fact that the distance between the real space position corresponding to the image portion included in the captured image and the vehicle is longer in the background image portion than the image portion of the pedestrian. In a situation where a plurality of pedestrians are close to each other, however, the image of a pedestrian's head may be included also in the left-hand mask area or the right-hand mask area in some cases. If so, the difference between the reference distance and the left-hand comparative distance or the right-hand comparative distance is small and therefore the second condition is not satisfied. Accordingly, the type of object in the real space corresponding to the first image portion is determined to be other than "pedestrian" as a result of determination only based on the second condition.

Therefore, the object type determination process unit causes the second image portion search process unit to search for the second image portion unless the second condition is satisfied. Thereafter, in the case where the plurality of the second image portions are detected, in other words, in the case where the plurality of image portions each having the feature value corresponding to the pedestrian's leg, the object type determination process unit determines that the object in the real space corresponding to the first image portion is a pedestrian. This prevents a plurality of pedestrians from being incorrectly recognized as other than pedestrians in cases where they are close to each other around the vehicle, which improves the accuracy in recognition of pedestrians.

According to a second aspect of the present invention, there is provided a vehicle surroundings monitoring apparatus which monitors the surroundings of a vehicle by using an image captured by a camera mounted on the vehicle, comprising: a first image portion extraction process unit which extracts a first image portion likely to be an image of a first predetermined portion in a predetermined type of object in a real space from the captured image; a reference mask area setting process unit which sets a predetermined area including the first image portion as a reference mask area in the captured image; a lower search area setting process unit which sets a lower search area under the reference mask area in the captured image; a third image portion search process unit which searches for a third image portion having a third feature value preset according to a case where the predetermined type of a plurality of objects exist within the lower search area; and an object type determination process unit which determines the type of object in the real space corresponding to the first image portion according to whether the third image portion search process unit detects the third image portion.

According to this invention, in cases where the predetermined type of a plurality of objects exist and it causes a situation where it is difficult to determine the type of object only by extracting the first image portion using the first image portion extraction process unit, it is possible to detect the predetermined type of a plurality of objects by searching for the third image portion and to thereby determine the type of object in the real space corresponding to the first image portion.

Moreover, in the vehicle surroundings monitoring apparatus of the second aspect of the present invention, the predetermined type is "pedestrian" and the first predetermined portion is a pedestrian's head; the third feature value is applicable to a case where the image portion includes an image of legs of a plurality of pedestrians; and the object type determination process unit determines that the type of object in the real space corresponding to the first image portion is "pedestrian" when the third image portion search process unit detects the third image portion.

According to this invention, in cases where the plurality of pedestrians exist and it causes a situation where it is difficult to determine whether the type of object is "pedestrian" only by extracting the image portion of the pedestrian's head, it is possible to determine whether the type of object in the real space corresponding to the first image portion is "pedestrian" by searching for the third image portion having a feature value corresponding to the image of legs of the plurality of pedestrians.

According to third aspect of the present invention, there is provided a vehicle surroundings monitoring apparatus which monitors the surroundings of a vehicle by using a computer which is provided in the apparatus and includes an interface circuit for accessing an image captured by a camera mounted on the vehicle, wherein the computer performs: a first image portion extraction process for extracting a first image portion likely to be an image of a first predetermined portion in a predetermined type of object in a real space from the captured image; a reference mask area setting process for setting a predetermined area including the first image portion as a reference mask area in the captured image; a lower search area setting process for setting a lower search area under the reference mask area in the captured image; a second image portion search process for searching for a second image portion having a preset feature value corresponding to a second predetermined portion in the predetermined type of object within the lower search area; and an object type determination process for determining the type of object in the real space corresponding to the first image portion according to whether a plurality of the second image portions are detected in the second image portion search process.

According to this invention, the computer performs the first image portion extraction process to extract the first image portion from the image captured by the camera. Furthermore, the computer performs the reference mask area setting process, the lower search area setting process, and the second image portion search process to search for the second image portion within the lower search area. Still further, the computer performs the object type determination process to determine the type of object in the real space corresponding to the first image portion according to whether the plurality of the second image portions are detected within the lower search area. Thereby, it is possible to accurately determine the type of object having the first image portion and the plurality of the second image portions under the first image portion (for example, a pedestrian or animal having a head and a plurality of symmetrical portions such as arms, shoulders, and legs under the head) when the object image is captured by the camera.

Furthermore, according to a vehicle equipped with the vehicle surroundings monitoring apparatus according to the first to third aspects of the present invention, the type of object around the vehicle can be determined with accuracy.

Subsequently, according to the present invention, there is provided a vehicle surroundings monitoring program which causes a computer having an interface circuit for accessing an image captured by a camera mounted on the vehicle to perform a function of monitoring the surroundings of the vehicle, the program causing the computer to function as: a first image portion extraction process unit which extracts a first image portion likely to be an image of a first predetermined portion in a predetermined type of object in a real space from the captured image; a reference mask area setting process unit which sets a predetermined area including the first image portion as a reference mask area in the captured image; a lower search area setting process unit which sets a lower search area under the reference mask area in the captured image; a second image portion search process unit which searches for a second image portion having a preset feature value corresponding to a second predetermined portion in the predetermined type of object within the lower search area; and an object type determination process unit which determines the type of object in the real space corresponding to the first image portion according to whether the second image portion search process unit detects a plurality of the second image portions.

The computer executes the vehicle surroundings monitoring program according to the present invention, whereby the computer functions as the first image portion extraction process unit and thereby the first image portion is extracted from the image captured by the camera. Furthermore, the computer functions as the reference mask area setting process unit, the lower search area setting process unit, and the second image portion search process unit and thereby the second image portion is searched for within the lower search area. Still further the computer functions as the object type determination process unit and thereby the type of object in the real space corresponding to the first image portion is determined according to whether the plurality of the second image portions are detected. Thereby, it is possible to accurately determine the type of object having the first image portion and the plurality of the second image portions under the first image portion (for example, a pedestrian or animal having a head and a plurality of symmetrical portions such as arms, shoulders, and legs under the head) when the object image is captured by the camera.

Subsequently, according to the present invention, there is provided a vehicle surroundings monitoring method of monitoring the surroundings of a vehicle by using a computer having an interface circuit for accessing an image captured by a camera mounted on the vehicle, the method comprising: a first image portion extraction step of causing the computer to extract a first image portion likely to be an image of a first predetermined portion in a predetermined type of object in a real space; a reference mask area setting step of causing the computer to set a predetermined area including the first image portion as a reference mask area in the captured image; a lower search area setting step of causing the computer to set a lower search area under the reference mask area in the captured image; a second image portion search step of causing the computer to search for a second image portion having a preset feature value corresponding to a second predetermined portion in the predetermined type of object within the lower search area; and an object type determination step of causing the computer to determine the type of object in the real space corresponding to the first image portion according to whether a plurality of the second image portions are detected in the second image portion search step.

The computer performs the vehicle surroundings monitoring method according to the present invention, whereby the first image portion is extracted from the image captured by the camera in the first image portion extraction step. Furthermore, the second image portion is searched for within the lower search area in the reference mask area setting step, the lower search area setting step, and the second image portion search step. Still further, in the object type determination step, the type of object in the real space corresponding to the first image portion is determined according to whether the plurality of the second image portions are detected within the lower search area in the object type determination step. Thereby, it is possible to accurately determine the type of object having the first image portion and the plurality of the second image portions under the first image portion (for example, a pedestrian or animal having a head and a plurality of symmetrical portions such as arms, shoulders, and legs under the head) when the object image is captured by the camera.

DETAILED DESCRIPTION OF THE PREFERRED EMBODIMENTS

Figure 1:
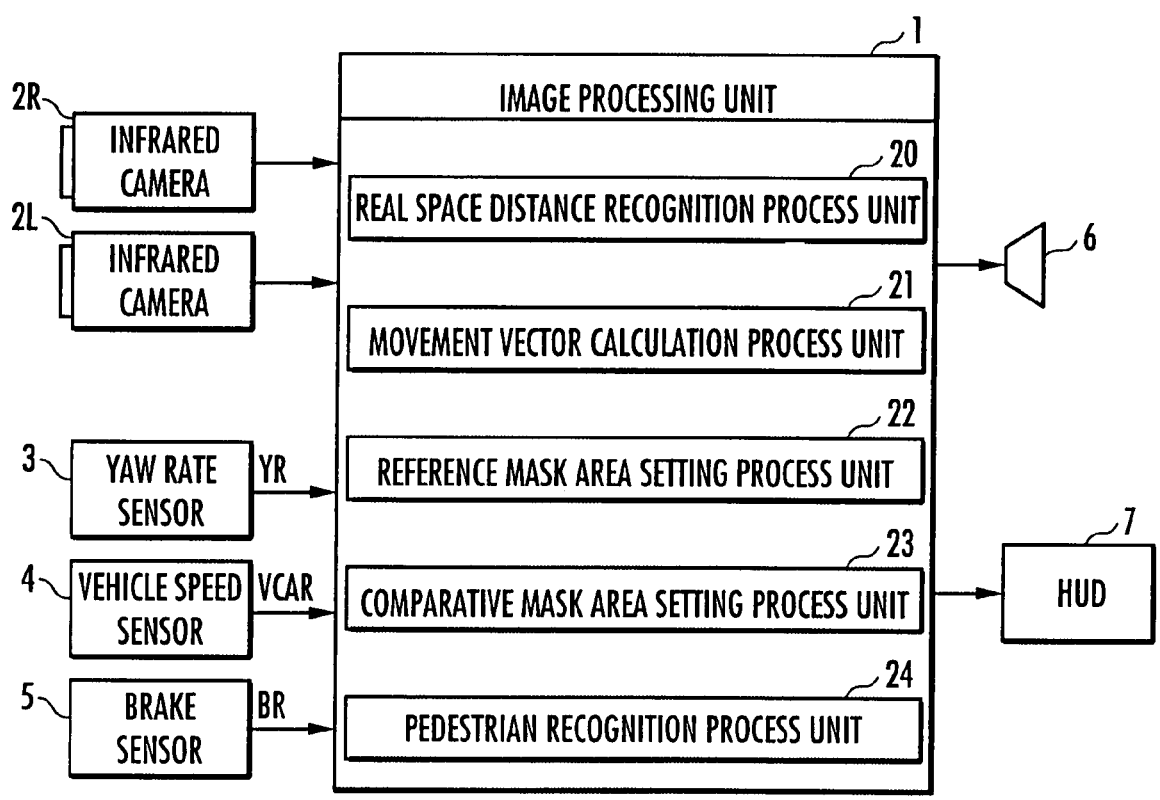
FIG. 1 is a configuration diagram of a vehicle surroundings monitoring apparatus according to the present invention.
Figure 2:
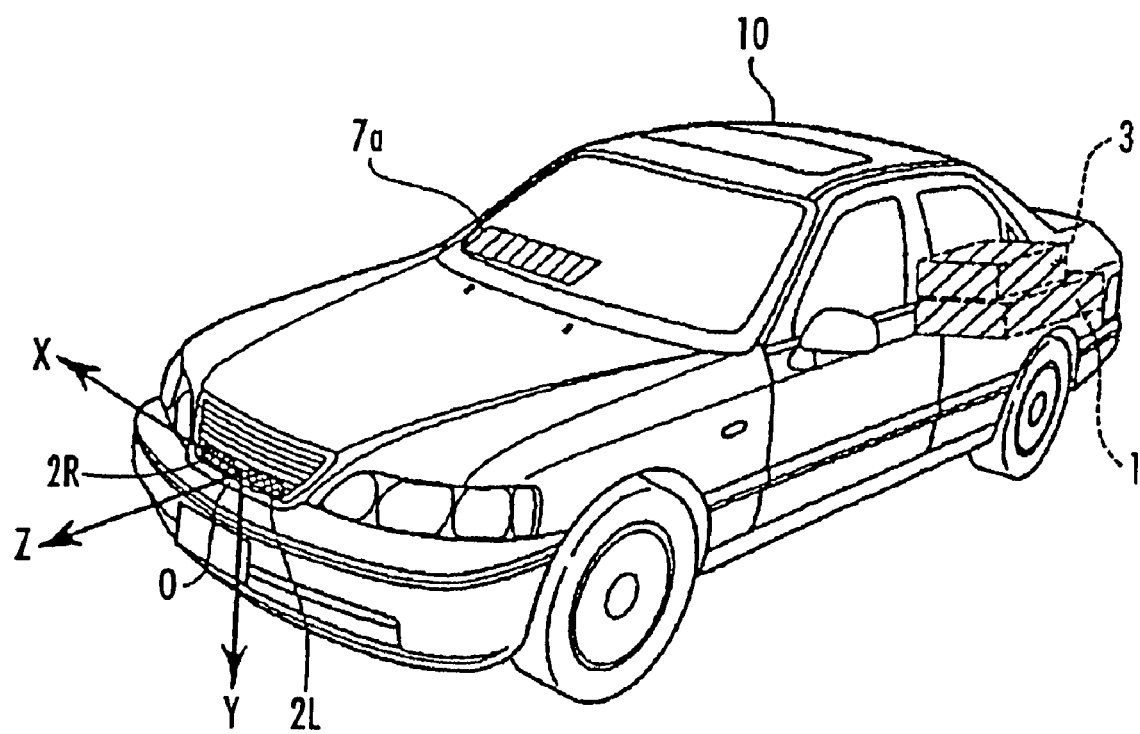
FIG. 2 is an explanatory diagram showing how the vehicle surroundings monitoring apparatus in FIG. 1 is mounted on a vehicle.
Figure 3:
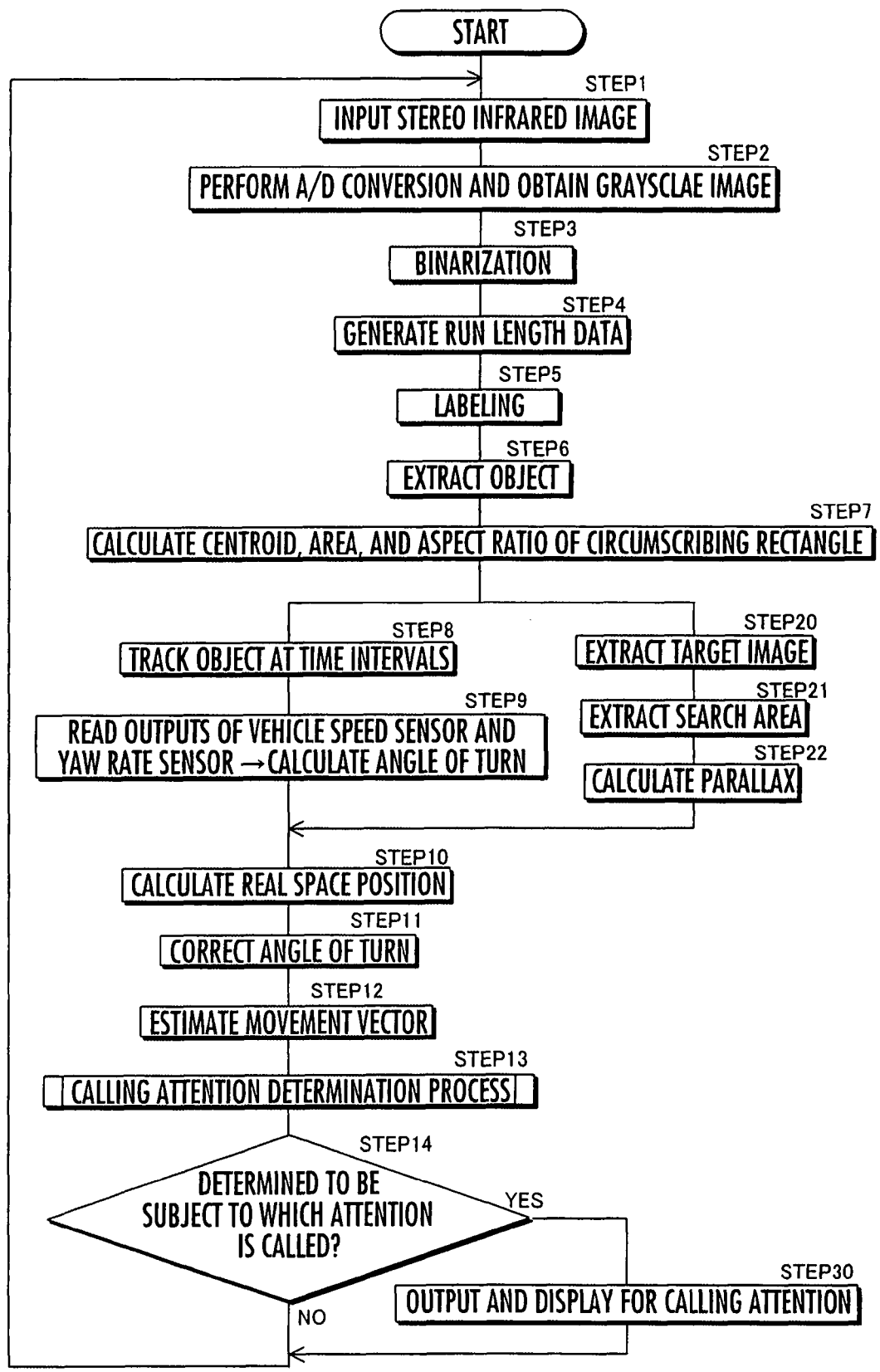
FIG. 3 is a flowchart showing a processing procedure in an image processing unit in FIG. 1.
Figure 4:
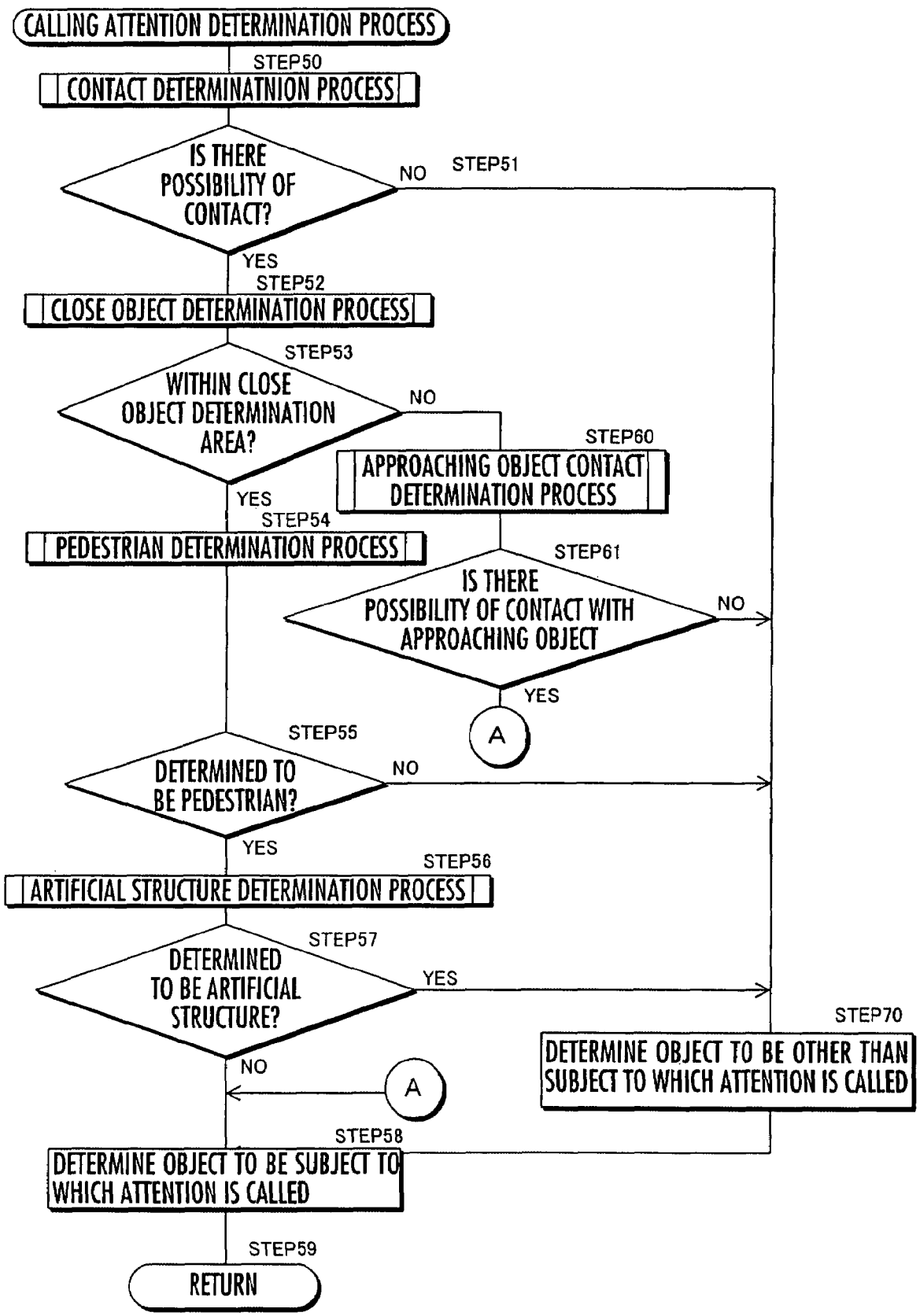
FIG. 4 is a flowchart showing a calling attention determination process.
Figure 5:
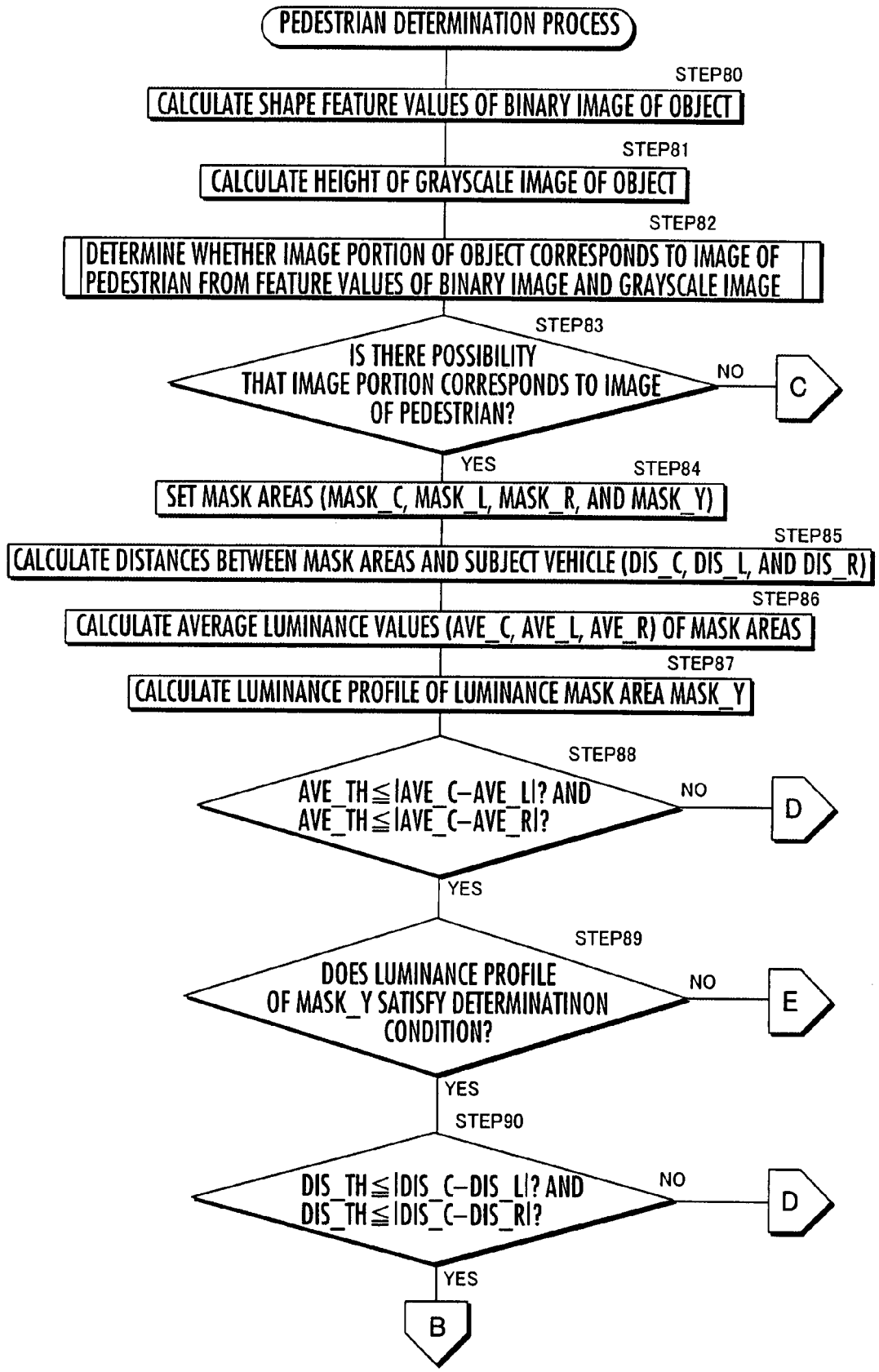
FIG. 5 is a flowchart showing a pedestrian determination process.

One embodiment of the present invention will now be described hereinafter with reference to FIG. 1 to FIG. 10. FIG. 1 is a configuration diagram of a vehicle surroundings monitoring apparatus according to the present invention; FIG. 2 is an explanatory diagram showing how the vehicle surroundings monitoring apparatus in FIG. 1 is mounted on a vehicle; FIG. 3 is a flowchart showing a processing procedure in an image processing unit in FIG. 1; FIG. 4 is a flowchart of a calling attention determination process; FIG. 5 and FIG. 6 are flowcharts showing a pedestrian determination process; FIG. 7 is an explanatory diagram for a case where a pedestrian or pedestrians are recognized by a comparison between a mask area including a head image and mask areas to the left and right thereof; FIG. 8 and FIG. 9 are explanatory diagrams for a case where a pedestrian or pedestrians are recognized by a luminance profile of the mask area including the head image; and FIG. 10 is an explanatory diagram of a detection process of a legs image of pedestrians.

Referring to FIG. 1, the vehicle surroundings monitoring apparatus according to the present invention includes an image processing unit 1; infrared cameras 2R and 2L (corresponding to the cameras in the present invention) which can detect far infrared rays; a yaw rate sensor 3 which detects a yaw rate of a vehicle; a vehicle speed sensor 4 which detects a traveling speed of the vehicle; a brake sensor 5 which detects a brake control input given by a driver; an image processing unit 1 which detects an object (a pedestrian or the like) ahead of the vehicle based on an image (captured image) obtained by the infrared camera 2 and calls attention in cases where a contact between the object and the vehicle is likely to occur; a loudspeaker 6 for use in calling attention with voice; and a display 7 for displaying images captured by the infrared cameras 2R and 2L and providing a display for causing the driver to visually identify an object likely to come in contact with the vehicle.

Referring to FIG. 2, the infrared cameras 2R and 2L are disposed in symmetrical positions about the center of the vehicle 10 in the vehicle width direction in the front part of the vehicle 10, and they are fixed to the front part of the vehicle 10 with the optical axes of the two infrared cameras 2R and 2L extending parallel to each other and with the infrared cameras 2R and 2L located at the same height from the road surface. The infrared cameras 2R and 2L each have a characteristic that the higher the temperature is the higher the output level is (the luminance increases). In addition, the display 7 is placed so that a screen 7a is displayed on the front window of the vehicle 10 on the driver's side thereof.

Referring to FIG. 1, the image processing unit 1 is an electronic unit including an image input circuit which converts analog video signals output from the infrared cameras 2R and 2L to digital data and stores them into an image memory and a computer (arithmetic processing circuit including a CPU, a memory, I/O circuits, and the like or a microcomputer having all of these functions), which performs various arithmetic processing operations for an image ahead of the vehicle stored into the image memory, having an interface circuit for use in accessing (reading or writing) the image data stored into the image memory.

Furthermore, the computer is caused to execute a vehicle surroundings monitoring program according to the present invention, and thereby the computer functions as a real space distance recognition process unit 20 which calculates a distance (real space distance) between the real space position corresponding to an image portion included in the captured image and the vehicle 10; a movement vector calculation process unit 21 which calculates a real space movement vector of an object concerned based on a change in position of the image portion of the identical object between images captured at predetermined time intervals; a reference mask area setting process unit 22 which sets an area including the image portion of an object likely to be a pedestrian as a reference mask area; a comparative mask area setting process unit 23 which sets a left-hand mask area and a right-hand mask area to the left and the right of the reference mask area; and a pedestrian recognition process unit 24 which recognizes whether the image portion of the reference mask area is an image of a pedestrian.

These process units then perform a fist image portion extraction process, a lower search area setting process, a second image portion search process, and an object type determination process of the present invention.

In addition, these process units perform a first image portion extraction step, a reference mask area setting step, a lower search area setting step, a second image portion search step, and an object type determination step of a vehicle surroundings monitoring method according to the present invention.

The following describes object detection and calling attention processes performed by the image processing unit 1 with reference to a flowchart shown in FIG. 3.

The image processing unit 1 inputs analog signals of infrared images output from the infrared cameras 2R and 2L in step 1, first, and then stores grayscale images digitized from the analog signals by an A/D conversion into the image memory in the next step 2. In step 1 and step 2, the grayscale image of the infrared camera 2R (hereinafter, referred to as the right image) and the grayscale image of the infrared camera 2L (hereinafter, referred to as the left image) are obtained. Due to a difference (parallax) between the right image and the left image in the horizontal position of the image portion of an identical object, it is possible to calculate a distance from the vehicle 10 to the object in the real space based on the parallax.

In the next step 3, the image processing unit 1 generates a binary image by performing binarization (a process of setting a value of "1 (white)" for a pixel having a luminance value equal to or greater than a threshold value and setting a value of "0 (black)" for a pixel having a luminance value lower than the threshold value) with the right image used as the standard image. In step 4, the image processing unit 1 converts the image portion of each white area included in the binary image to run length data (data of lines of white pixels continuous in the x (horizontal) direction of the binary image). Furthermore, the image processing unit 1 performs labeling with lines overlapping in the y (vertical) direction in the binary image considered as one image portion in step 5 and extracts the labeled image portion as an image candidate of the object in step 6.

In the next step 7, the image processing unit 1 calculates the centroid G, the area S, and the aspect ratio ASPECT of a circumscribing rectangle of each image candidate. Since specific calculation method has been described in detail in Japanese publication of unexamined patent application No. 2004-303219, its description is omitted here. Thereafter, the image processing unit 1 performs step 8 to step 9 and step 20 to step 22 in parallel.

In step 8, the image processing unit 1 determines the identify of the object images extracted from the binary images based on the images captured by the infrared cameras 2R and 2L for each predetermined sampling period. Thereafter, the image processing unit 1 stores time-series data of the position (centroid position) of the image determined to be the identical object image into the memory (tracking at time intervals).

Furthermore, in step 9, the image processing unit 1 reads a vehicle speed VCAR detected by the vehicle speed sensor 4 and a yaw rate YR detected by the yaw rate sensor 3 and integrates the yaw rate YR over time to calculate the angle of turn θr of the vehicle 10.

On the other hand, in step 20, the image processing unit 1 selects one of the image candidates of the object tracked using the binary image of the standard image (right image) to extract a target image R1 (an image of the entire area enclosed by the circumscribing rectangle of the selected candidate image) from the grayscale image of the right image.

In the next step 21, the image processing unit 1 sets a search area for searching for an image (hereinafter, referred to as the corresponding image R1') corresponding to the target image R1 from the grayscale image of the left image and extracts the corresponding image R1' by performing correlation operation with the target image R1. Thereafter, the image processing unit 1 calculates a difference between the centroid position of the target image R1 and the centroid position of the corresponding image R1' as a parallax Δd (the number of pixels) in step 22 and then the control proceeds to step 10.

Step 10 is a process performed by the real space distance recognition process unit 20. The real space distance recognition process unit 20 calculates a distance z between the vehicle 10 and the object based on the parallax Δd, converts the coordinates (x, y) of the target image and the distance z to real space coordinates (X, Y, Z), and calculates the coordinates of the real space position corresponding to the target image. As shown in FIG. 2, the real space coordinates (X, Y, Z) are set in such a way that X, Y, and Z are in the vehicle speed direction of the vehicle 10, the vertical direction, and the forward direction of the vehicle 10, respectively, with the midpoint position between the mounting positions of the infrared cameras 2R and 2L as the origin 0. In addition, the image coordinates are set such that x is in the horizontal direction and y is in the vertical direction with the center of the image as the origin.

In the next step 11, the image processing unit 1 performs turn angle-dependent correction for correcting a position displacement in the image caused by turning around of the vehicle 10. The next step 12 is a process performed by the movement vector calculation process unit 21. The movement vector calculation process unit 21 calculates a relative movement vector between the object and the vehicle 10 from time-series data of the real space position of the identical object after the turn angle-dependent correction obtained from the plurality of images captured within a predetermined monitoring period.

A specific calculation method of the real space coordinates (X, Y, Z) and that of the movement vector are described in detail in Japanese publication of unexamined patent application No. 2004-303219. Therefore, their descriptions will be omitted here.

Subsequently, in step 13, the image processing unit 1 determines the possibility of contact between the vehicle 10 and the detected object and then performs a "calling attention determination process" for determining whether there is a need to call attention. If it is determined that there is the need to call attention in the "calling attention determination process," the control branches to step 30 to output a voice for calling attention using a loudspeaker 6 and to produce a display for calling attention on the display 7. On the other hand, in the case where it is determined that there is no need to call attention in the "calling attention determination process," the control returns to step 1, without calling attention by the image processing unit 1.

Subsequently, the specific content of the "calling attention determination process" will be described below with reference to the flowchart shown in FIG. 4.

In step 50 in FIG. 4, the image processing unit 1 performs the "contact determination process" for determining whether there is a possibility of contact between the vehicle 10 and the detected object. The "contact determination process" is performed to determine whether there is a possibility of contact between the object and the vehicle 10 within a time allowed T (for example, two to five seconds) by calculating a relative speed between the object and the vehicle 10.

If it is determined that there is no possibility of contact between the object and the vehicle 10 within the time allowed T in the "contact determination process," the control branches from the next step 51 to step 70, where the image processing unit 1 determines that the object is not a subject to which attention is called. Then, the control proceeds to step 59, where the image processing unit 1 terminates the "calling attention determination process."

On the other hand, in the case where it is determined that there is the possibility of contact between the object and the vehicle 10 in step 50, the control proceeds from step 51 to step 52, where the image processing unit 1 performs a "close object determination process." The "close object determination process" is performed to determine whether the object exists within the close object determination area which is set ahead of the vehicle 10.

If it is determined that the object does not exist within the close object determination area by the "close object determination process," the control branches from the next step 53 to step 60, where the image processing unit 1 performs the "approaching object contact determination process." The "approaching object contact determination process" is performed to determine whether there is a possibility that the object enters the close object determination area and comes in contact with the vehicle 10. The image processing unit 1 determines whether there is the possibility that the object, which exists in the approaching object determination area set to the outside of the close object determination area in the horizontal direction, enters the close object determination area and comes in contact with the vehicle 10 from the movement vector of the object in the "approaching object contact determination process."

If it is determined that there is no possibility that the object comes in contact with the vehicle 10 in the "approaching object contact determination process," the control branches from the next step 61 to step 70. The image processing unit 1 then determines that the object is not a subject to which attention is called and the control proceeds to step 59, where the image processing unit 1 terminates the "calling attention determination process." On the other hand, in the case where there is the possibility that the object comes in contact with the vehicle 10 in the "approaching object contact determination process," the control proceeds from step 61 to step 58. The image processing unit 1 then determines that the object is a subject to which attention is called and the control proceeds to step 59, where the image processing unit 1 terminates the "calling attention determination process."

If it is determined that the object exists within the close object determination area in the "close object determination process" in step 52, the control proceeds from step 53 to step 54, where the image processing unit 1 performs the "pedestrian determination process." The "pedestrian determination process" is performed to determine whether the object is a pedestrian. The details of the "pedestrian determination process" will be described later.

If the object is determined not to be a pedestrian in the "pedestrian determination process," the control branches from the next step 57 to step 70. Then, the image processing unit 1 determines that the object is not a subject to which attention is called, and the control proceeds to step 59, where the image processing unit 1 terminates the "calling attention determination process."

On the other hand, in the case where the object is determined to be a pedestrian in the "pedestrian determination process," the control proceeds from step 55 to step 56. Then, the image processing unit 1 performs an "artificial structure determination process" for determining whether the object determined to be a pedestrian is an artificial structure. The "artificial structure determination process" is performed to determine that the object is an artificial structure in the case where the image portion of the object has a feature supposed to be impossible for a pedestrian's image (including a straight edge portion, a right-angle portion, a plurality of identically-shaped portions, or the like).

If the object is determined to be an artificial structure in the "artificial structure determination process," the control branches from the next step 57 to step 70. Then, the image processing unit 1 determines that the object is not a subject to which attention is called and the control proceeds to step 59, where the image processing unit 1 terminates the "calling attention determination process." On the other hand, in the case where it is determined that the object is not an artificial structure in the "artificial structure determination process," the control proceeds from step 57 to step 58. Then, the image processing unit 1 determines that the object is a subject to which attention is called and the control proceeds to step 59, where the image processing unit 1 terminates the "calling attention determination process."

The following describes the procedure for performing a "pedestrian determination process" with reference to flowcharts shown in FIG. 5 and FIG. 6.

The image processing unit 1 calculates shape feature values (a ratio between the circumscribing rectangle and the area, and the aspect ratio, width, and height of the circumscribing rectangle or the like) of the binary image of the object in step 80 of FIG. 5 and calculates the height of the grayscale image of the object in step 81. Then, in the next step 82, the image processing unit 1 determines whether the feature values of the binary image and grayscale image of the object are within the range appropriate for a case where the object is a pedestrian to determine whether the object is likely to be a pedestrian.

Unless it is determined that the object is likely to be a pedestrian, the control branches from the next step 83 to step 100 of FIG. 6(*a*). Then, the image processing unit 1 determines that the object is not a pedestrian, and the control proceeds to step 94, where the image processing unit 1 terminates the "pedestrian determination process." On the other hand, in the case where it is determined that the object is likely to be a pedestrian, the control proceeds from step 83 to step 84.

In step 84, the image processing unit 1 extracts a first image portion presumed to be an image of a head from the image portions of objects. The image of the head can be extracted by using a method of pattern matching with a previously registered head image pattern in the grayscale image or calculation of a feature value in the binary image.

The image processing unit 1 sets the circumscribing rectangle of the first image portion as a reference mask area MASK_C and sets a range slightly wider than the reference mask area MASK_C as a luminance mask area MASK_Y by means of the reference mask area setting process unit 22. In addition, the image processing unit 1 sets the area near and on the left side of the reference mask area MASK_C as a left-hand mask area MASK_L and sets the area near and on the right side of the reference mask area MASK_C as a right-hand mask area MASK_R by means of the comparative mask area setting process unit 23.

In step 84, the component for extracting the first image portion corresponds to the first image portion extraction process unit of the present invention; the process for extracting the first image portion corresponds to the first image portion extraction process of the present invention; and the step of performing the process corresponds to the first image portion extraction step in the vehicle surroundings monitoring method of the present invention.

The reference mask area MASK_C and the luminance mask area MASK_Y correspond to the reference mask area of the present invention. In addition, in step 84, the process of setting the reference mask area MASK_C and the luminance mask area MASK_Y corresponds to the reference mask area setting process of the present invention and the step of performing the process corresponds to the reference mask area setting step in the vehicle surroundings monitoring method of the present invention.

For example, in the captured image shown in FIG. 7(*a*), the circumscribing rectangle of the first image portion HP_1 presumed to be the image of the pedestrian's head is set to the reference mask area MASK_C. Furthermore, the left-hand mask area MASK_L is set near and on the left side of the reference mask area MASK_C and the right-hand mask area MASK_R is set near and on the right side of the reference mask area MASK_C. In addition, as shown in FIG. 8(*a*), the luminance mask area MASK_Y is set in a range wider than the reference mask area MASK_C.

In the next step 85 to step 94 in FIG. 6(*a*), step 100, step 110 to step 112 in FIG. 6(*b*), and step 120 are performed by the pedestrian recognition process unit 24 (See FIG. 1).

The pedestrian recognition process unit 24 calculates a distance between the real space position corresponding to the image portion of the reference mask area MASK_C and the vehicle 10 as a reference distance DIS_C by means of the real space distance recognition process unit 20. In addition, it calculates a distance between the real space position corresponding to the image portion of the left-hand mask area MASK_L and the vehicle 10 as a left-hand comparative distance DIS_L and calculates a distance between the real space position corresponding to the image portion of the right-hand mask area MASK_R and the vehicle 10 as a right-hand comparative distance DIS_R.

Furthermore, in step 86, the pedestrian recognition process unit 24 calculates average luminance values (AVE_C, AVE_L, AVE_R) in the grayscale image of the mask areas (MASK_C, MASK_L, MASK_R).

In the next step 87, the pedestrian recognition process unit 24 calculates a luminance profile of the luminance mask area MASK_Y. The luminance profile is an integrated luminance distribution in the x direction (horizontal direction) in which the luminance values of pixels of the luminance mask area MASK_Y in the grayscale image are integrated in the y direction (vertical direction).

FIG. 8(*b*) shows the luminance profile calculated regarding the luminance mask area MASK_Y in FIG. 8(*a*), with the abscissa axis set to represent the x coordinate of the grayscale image and the ordinate axis set to represent a luminance integrated value (integrated luminance) at each x coordinate. In addition, x1 in FIG. 8(*b*) indicates the x coordinate of LINE_1 in FIG. 8(*a*). As shown in FIG. 8(*b*), the luminance profile YP_1 of the luminance mask area MASK_Y including the image JP_1 of the pedestrian's head has a feature that the integrated luminance decreases as the x coordinate is farther from the peak point with the vicinity of the center (LINE_1) of the image portion HP_1 of the head assumed to be the peak point.

Subsequently, in step 88, the pedestrian recognition process unit 24 recognizes whether the object is a pedestrian based on an average luminance. Specifically, in the case where a difference between an average luminance AVE_C of the reference mask area MSK_C and an average luminance AVE_L of the left-hand mask area MSK_L is equal to or greater than a preset threshold value AVE_TH (corresponding to the first predetermined level of the present invention) (AVE_TH≦|AVE_C−AVE_L|) and a difference between an average luminance AVE_C of the reference mask area MSK_C and an average luminance AVE_R of the right-hand mask area MSK_R is equal to or greater than a threshold value AVE_TH (corresponding to the second predetermined level of the present invention) (AVE_TH≦|AVE_C−AVE_R|) (hereinafter, referred to as the first pedestrian recognition condition), the pedestrian recognition process unit 24 recognizes that the object is likely to be a pedestrian.

Referring here to FIG. 7(*a*), the average luminance AVE_C of the reference mask area MASK_C including the image portion HP_1 of the head is high since the pedestrian's head has a high emission level of the infrared radiation. On the other hand, the average luminance AVE_L of the left-hand mask area MASK_L and the average luminance AVE_R of the right-hand mask area MASK_R are low since these areas are the background (wall or the like) having a low emission level of the infrared radiation. Therefore, the first pedestrian recognition condition is satisfied.

On the other hand, unless the first pedestrian recognition condition is satisfied, in other words, in the case where the difference between the average luminance AVE_C of the reference mask-area MASK_C and the average luminance AVE_L of the left-hand mask area MASK_L or the average luminance AVE_R of the right-hand mask area MASK_R is small, it is difficult to determine definitely whether the object is a pedestrian.

Therefore, in this case, the control branches from step 88 to step 110 in FIG. 6(*b*). Thereafter, the pedestrian recognition process unit 24 sets a lower search area AREA_3 under the reference mask area MASK_C, the left-hand mask area MASK_L, and the right-hand mask area MASK_R with reference to FIG. 7(*b*).

The component for setting the lower search area AREA_3 as described above corresponds to the lower search area setting process unit of the present invention; the process for setting the lower search area AREA_3 corresponds to the lower search area setting process of the present invention; and the step of performing the process corresponds to the lower search area setting step of the vehicle surroundings monitoring method of the present invention.

FIG. 7(*b*) shows an image in a situation in which three pedestrians are close to each other. In this situation, the reference mask area MASK_C includes an image portion HP_2 of a pedestrian's head; the left-hand mask area MASK_L includes an image portion HP_3 of a pedestrian's head; and the right-hand mask area MASK_R includes an image portion HP_4 of a pedestrian's head. This causes the average luminance AVE_L of the left-hand mask area MASK_L and the average luminance AVE_R of the right-hand mask area MASK_R to be high, by which the first pedestrian recognition condition is not satisfied.

Accordingly, the pedestrian recognition process unit 24 searches for a second image portion presumed to be an image of a pedestrian's leg within the lower search area set under the reference mask area MASK_C, the left-hand mask area MASK_L, and the right-hand mask area MASK_R in step 111 shown in FIG. 6(*b*). Unless two or more image portions are found which are presumed to be the images of the leg, the control branches from the next step 112 to step 100 in FIG. 6(*a*), where the pedestrian recognition process unit 24 determines that the object is not a pedestrian. Then, the control proceeds to step 94, where the image processing unit 1 terminates the "pedestrian determination process."

The component for searching for the second image portion within the lower search area corresponds to the second image portion search process unit of the present invention and the step of searching for the second image portion within the lower search area corresponds to the second image portion search step of the vehicle surroundings monitoring method of the present invention.

Similarly to the above case of the head image, the image of the pedestrian's leg can be searched for by using a method of pattern matching with a previously registered head image pattern in the grayscale image or calculation of a feature value in the binary image.

For example, FIG. 10(*a*) shows a binary image where three pedestrians are close to each other, illustrating the result of searching as the second image portion for a portion having a width Lw, which is within a predetermined range (preset with the width of the pedestrian's leg in the real space assumed), and having a length L1, which is within a predetermined range (preset with the length of the pedestrian's leg in the real space assumed), in the lower search area AREA_5 set under the reference mask area MASK_Y.

In this instance, LP_9 having a width of Lw_9 and a length L1_9, LP_10 having a width of Lw_10 and a length L1_10, LP_11 having a width of Lw_11 and a length L1_11, LP_12 having a width of Lw_12 and a length L1_12 are detected as the second image portions.

Furthermore, FIG. 10(*b*) shows a luminance profile of the lower search area AREA_5 shown in FIG. 10(*a*), with the ordinate axis set to represent the integrated luminance and the abscissa axis set to represent the x coordinate. In this instance, the luminance profile YP_3 has four local maximum points (points at $x=x_{10}, x_{11}, x_{12}, x_{13}$) corresponding to the second image portions LP_9, LP_10, LP_11, and LP_12 shown in FIG. 10(*a*), respectively. Therefore, it is also possible to determine that a plurality of second image portions (the image portions of a leg) exist within the lower search area when the luminance profile of the lower search area has a plurality of local maximum points.

On the other hand, in the case where two or more second image portions (the image portions of a pedestrian's leg) are detected within the lower search area in step 111 in FIG. 6(*b*), the control proceeds from step 112 to step 93 in FIG. 6(*a*), where the pedestrian recognition process unit 24 determines that the object type is "pedestrian." Then the control proceeds to step 94, where the image processing unit 1 terminates the "pedestrian determination process."

The component for determining the object type to be "pedestrian" as described above corresponds to the object type determination process unit of the present invention; the process for determining the object type to be "pedestrian" corresponds to the object type determination process of the present invention; and a step of performing the process corresponds to the object type determination step of the vehicle surroundings monitoring method of the present invention.

For example, in FIG. 7(*b*), the lower search area AREA_3 is set under the reference mask area MASK_C, the left-hand mask area MASK_L, and the right-hand mask area MASK_R. Thereafter, the lower search area AREA_3 is searched to thereby detect four second image portions (the image portions of a pedestrian's leg) LP_1, LP_2, LP_3, and LP_4. Therefore, the object type is determined to be "pedestrian."

The second image portions (the image portions of a pedestrian's leg) are searched for by the processing of step 110 to step 112 for an object not satisfying the first pedestrian recognition condition as described above. Thereby, even if the object is a plurality of pedestrians close to each other as shown in FIG. 7(*b*), it is possible to determine that the object type is "pedestrian."

In addition, in the case where the first pedestrian recognition condition is satisfied in step 88 shown in FIG. 5, the control proceeds to step 89, where the pedestrian recognition process unit 24 determines whether the object is a pedestrian based on the luminance profile. More specifically, in the case where the luminance profile of the luminance mask area MASK_Y satisfies a preset reference feature (one peak point of the integrated luminance, an integrated luminance value of the peak point equal to or greater than a predetermined value, the integrated luminance gradually decreasing as the x coordinate is farther from the peak point, or the like) (hereinafter, referred to as the second pedestrian recognition condition), the pedestrian recognition process unit 24 determines that the object is likely to be a pedestrian.

If the object is a single pedestrian as shown in FIG. 8(*a*), the luminance profile of the luminance mask area MASK_Y has a form (YP_1) shown in FIG. 8(*b*) and satisfies the second pedestrian recognition condition (corresponds to the case where the luminance distribution of the reference mask area satisfies the predetermined condition in the present invention). Therefore, the pedestrian recognition process unit 24 can recognize that the object, is a pedestrian.

Figure 9A:
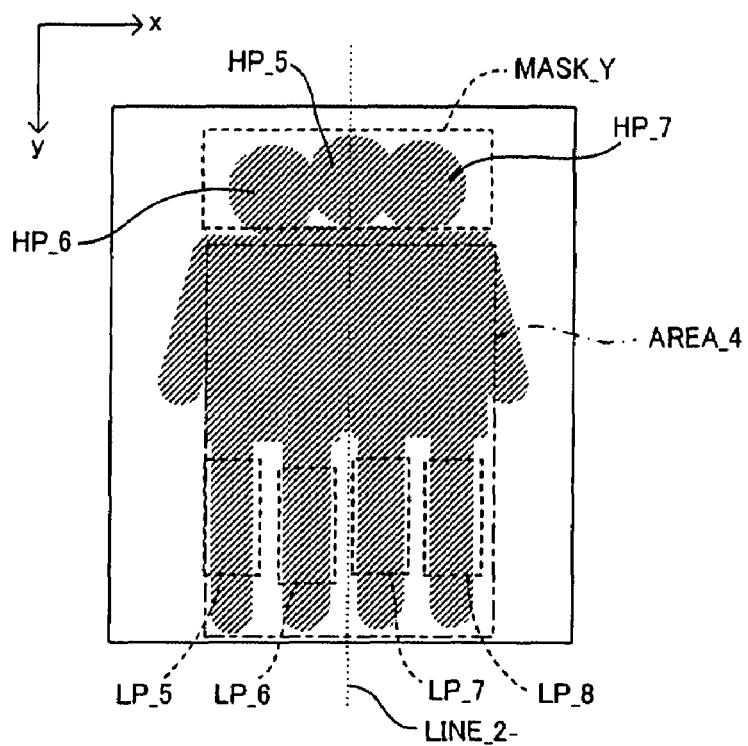
FIG. 9 is an explanatory diagram for a case where pedestrians are recognized by a luminance profile of the mask area including the head image.
Figure 9B:
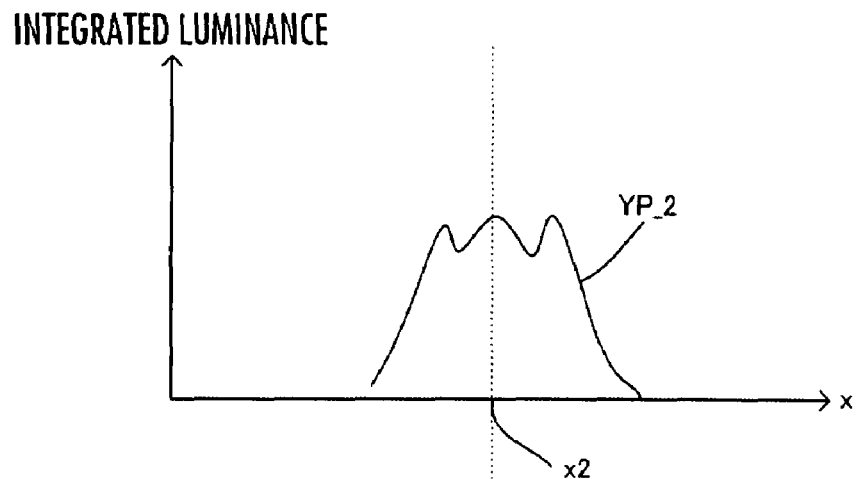

On the other hand, as shown in FIG. 9(*a*), in the case where the object is a plurality of pedestrians close to each other, the luminance mask area MASK_Y includes the image portions of three heads, HP_5, HP_6, and HP_7 and thus the luminance profile of the luminance mask area MASK_Y has a form (YP_2) as shown in FIG. 9(*b*) and has a plurality of peak points. Therefore, it does not satisfy the second pedestrian recognition condition (corresponds to a case where the luminance distribution of the reference mask area does not satisfy the predetermined condition in the present invention). Note that x2 in FIG. 9(b) indicates an x coordinate corresponding to LINE_2 in FIG. 9(a).

Figure 6A:
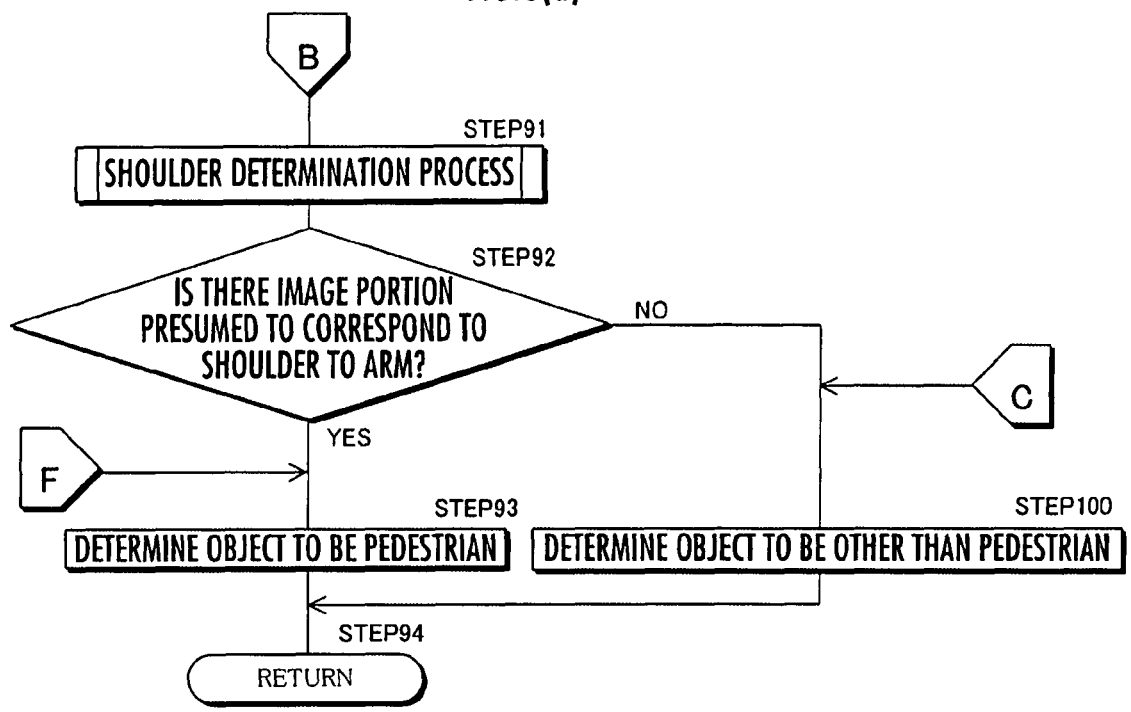
FIG. 6 is a flowchart showing a pedestrian determination process.
Figure 6B:
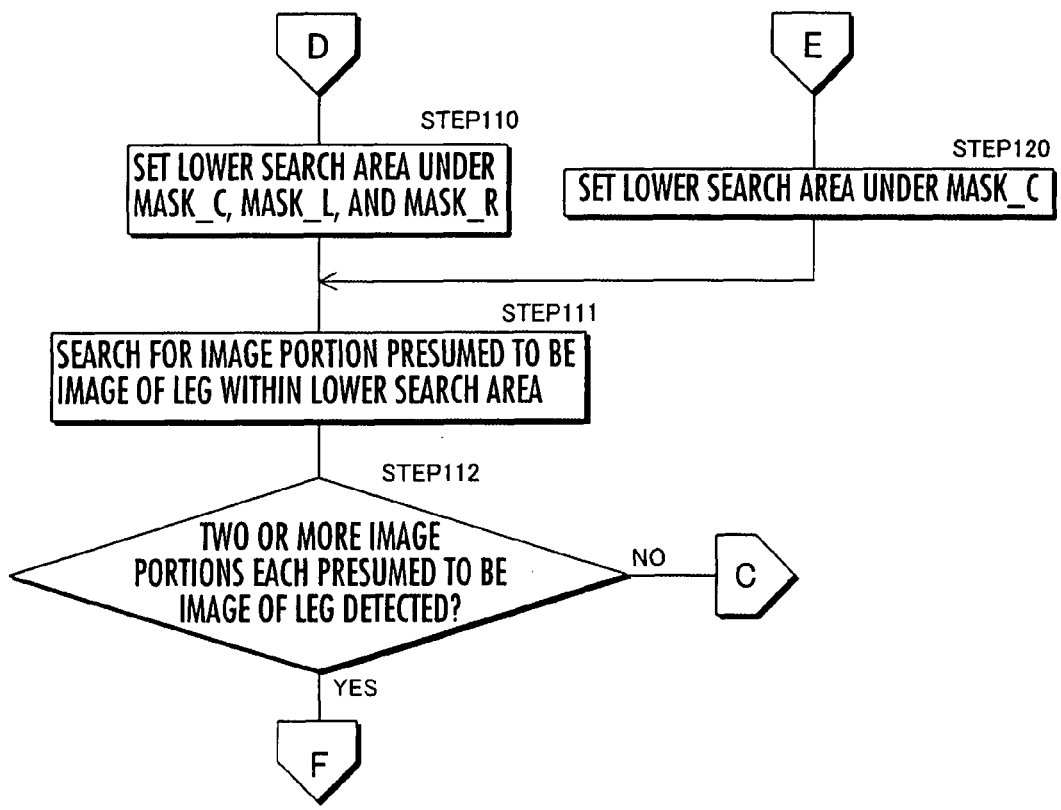

Accordingly, in this instance, the control branches from step 89 to step 120 in FIG. 6(b), where the pedestrian recognition process unit 24 sets a lower search area under the luminance mask area MASK_Y. Thereafter, it performs the processing of step 111 and subsequent steps to determine whether the object type is "pedestrian" similarly to the case where the first pedestrian recognition condition is not satisfied in the above.

The component for setting the lower search area under the luminance mask area as described above corresponds to the lower search area setting process unit of the present invention; the process for setting the lower search area corresponds to the lower search area setting process of the present invention; and the step of performing the process corresponds to the lower search area setting step in the vehicle surroundings monitoring method of the present invention. Furthermore, the component for determining whether the object type is "pedestrian" corresponds to the object type determination process unit of the present invention; the process for determining whether the object type is "pedestrian" corresponds to the object type determination process of the present invention; and the step of performing the process corresponds to the object type determination step in the vehicle surroundings monitoring method of the present invention.

For example, in FIG. 9(a), the lower search area AREA_4 is set under the luminance mask area MASK_Y. Thereafter, the lower search area AREA_4 is searched to thereby detect four second image portions LP_5, LP_6, LP_7, and LP_8 which are presumed to be the images of a pedestrian's leg. Therefore, the object type is determined to be "pedestrian."

As described above, the second image portions presumed to be the images of a pedestrian's leg are searched for in the processing of step 120 and step 111 to step 112 for the object not satisfying the second pedestrian recognition condition. Thereby, as shown in FIG. 9(a), it is possible to determine that the object type is "pedestrian" even if the object is a plurality of pedestrians close to each other.

Subsequently, in the case where the second pedestrian recognition condition is satisfied in step 89 in FIG. 5, the control proceeds to step 90, where the pedestrian recognition process unit 24 determines whether the object is a pedestrian based on the distance between the object and the vehicle 10. More specifically, it determines that the object is likely to be a pedestrian in the case where the difference between the reference distance DIS_C and the left-hand comparative distance DIS_L calculated in step 85 in the above is equal to or greater than the preset threshold DIS_TH (corresponding to the first predetermined distance of the present invention) (DIS_TH≦|DIS_C−DIS_L|) and the difference between the reference distance DIS_C and the right-hand comparative distance DIS_R is equal to or greater than the threshold DIS_TH (corresponding to the second distance of the present invention) (DIS_TH≦|DIS_C−DIS_R|) (hereinafter, referred to as the third pedestrian recognition condition).

Figure 7A:
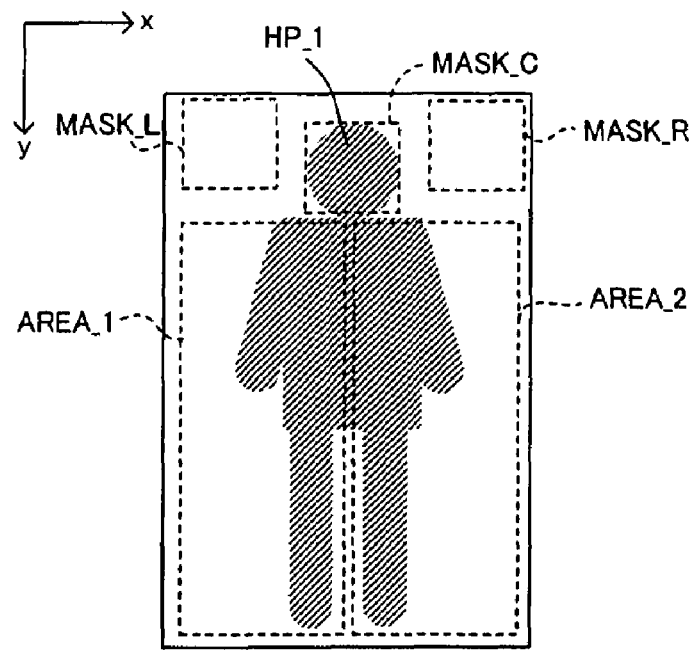
FIG. 7 is an explanatory diagram for a case where a pedestrian or pedestrians are recognized by a comparison between a mask area including a head image and mask areas to the left and right thereof.
Figure 8A:
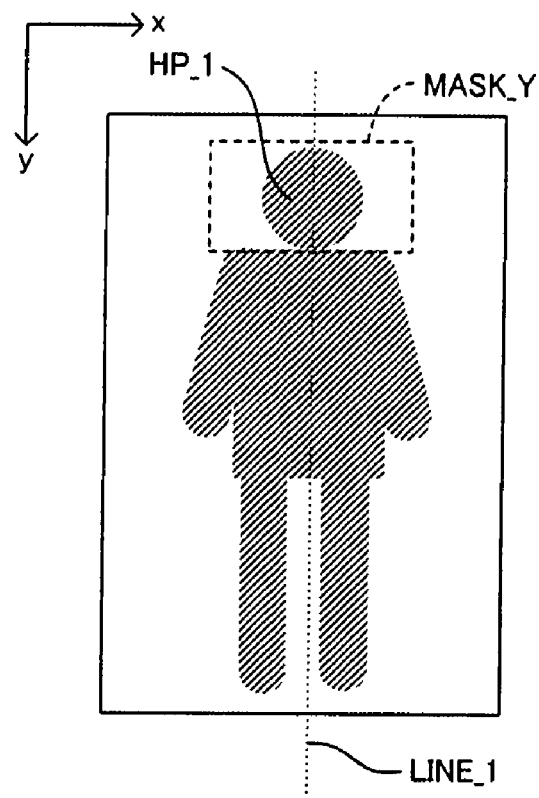
FIG. 8 is an explanatory diagram for a case where a pedestrian is recognized by a luminance profile of the mask area including the head image.
Figure 8B:
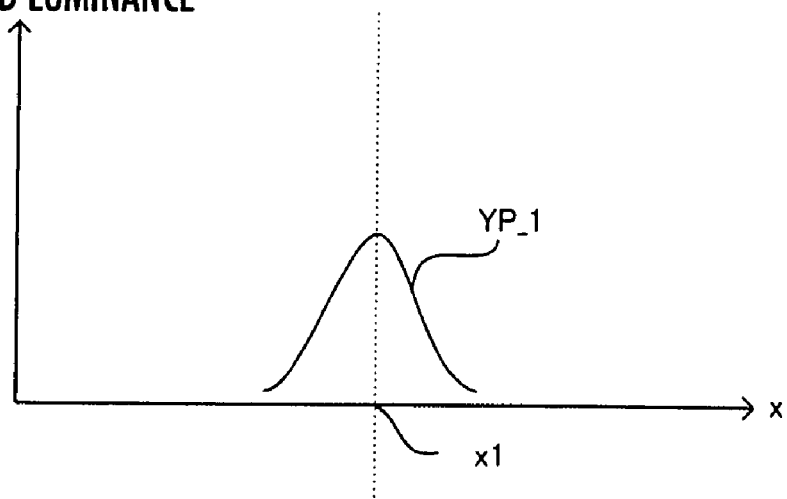

If the object is a single pedestrian as shown in FIG. 7(a), the left-hand mask area MASK_L and the right-hand mask area MASK_R are background portions of the pedestrian relative to the reference mask area MASK_C including the image portion of the pedestrian's head. Therefore, the difference between the reference distance DIS_C and the left-hand comparative distance DIS_R or the right-hand comparative distance DIS_L is large, and therefore the third pedestrian recognition condition is satisfied.

On the other hand, unless the third pedestrian recognition condition is satisfied, in other words, in the case where the difference between the reference distance DIS_C and the left-hand comparative distance is smaller than the threshold value DIS_TH or the difference between the reference distance DIS_C and the right-hand comparative distance is smaller than the threshold value DIS_TH, it is difficult to definitely determine whether the object type is "pedestrian."

Figure 7B:
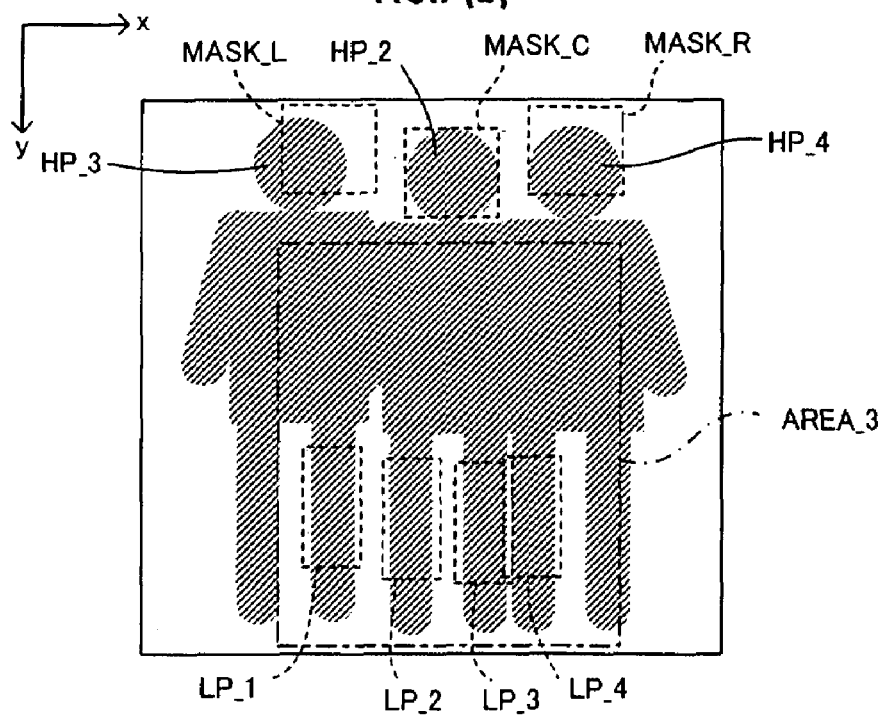

Therefore, in this case, the control branches from step 90 to step 110 in FIG. 6(b), where the pedestrian recognition process unit 24 determines whether the object type is "pedestrian" by performing the processing of step 110 and subsequent steps similarly to the above case where the first pedestrian recognition condition is not satisfied. Thereby, even if the plurality of pedestrians are close to each other as shown in FIG. 7(b), it is possible to determine that the object type is "pedestrian."

Furthermore, in the case where the third pedestrian recognition condition is satisfied in step 90, the control proceeds to step 91 in FIG. 6(a), where the pedestrian recognition process unit 24 performs a "shoulder determination process." The "shoulder determination process" is performed by searching for an image portion corresponding to a shoulder to an arm in each of the search area AREA_1 set on the left side of the part under the reference mask area MASK_C and the search area AREA_2 set on the right side of the part under the reference mask area MASK_C as shown in FIG. 7(a).

If the image portion corresponding to the shoulder to the arm is detected in each of the search area AREA_1 and the search area AREA_2, the control proceeds to the next step 92 to step 93, where the pedestrian recognition process unit 24 determines that the object is a pedestrian. Thereafter, the control proceeds to step 94 to terminate the "pedestrian determination process." On the other hand, unless the image portion corresponding to the shoulder to the arm is detected in the search area AREA_1 or AREA_2, the control branches from step 92 to step 100, where the pedestrian recognition process unit 24 determines that the object is not a pedestrian. Thereafter, the control proceeds to step 94 to terminate the "pedestrian determination process."

In this embodiment, it is determined whether the object is a pedestrian according to the first pedestrian recognition condition in step 88 in FIG. 5, whether the object is a pedestrian according to the second pedestrian recognition condition in step 89, and whether the object is a pedestrian according to the third pedestrian recognition condition in step 90 in the "pedestrian determination process." If at least one of these conditions is used, however, the effect of the present invention can be achieved.

Furthermore, while the first predetermined level is equal to the second predetermined level (AVE_TH) in the first pedestrian recognition condition of the present invention in this embodiment, they can be set to values different from each other.

Still further, while the first predetermined distance is the same as the second predetermined distance (DIS_TH) in the third pedestrian recognition condition of the present invention in this embodiment, they can be set to values different from each other.

While the average luminance is used as the luminance of each of the reference mask area MASK_C, the left-hand mask area MASK_L, and the right-hand mask area MASK_R in this embodiment, it is possible to use a representative value or a mean value of each area.

Furthermore, while the luminance profile of the luminance mask area MASK_Y is used to determine whether the luminance distribution of the luminance mask area of the present invention satisfies the predetermined condition in this embodiment, it is also possible to use another index such as a luminance variance of the luminance mask area.

Still further, while the configuration for capturing an image ahead of the vehicle is shown in this embodiment, it is also possible to determine whether there is a possibility of contact with the object by capturing images in the backward or lateral direction or any other directions.

Furthermore, while the infrared cameras 2R and 2L are used as the cameras of the present invention in this embodiment, it is also possible to use a visible camera for capturing visible images.

In addition, the real space distance recognition process unit 20 calculated the distance between the vehicle 10 and the object based on the parallax of the captured image of the infrared camera 2R and that of the infrared camera 2L in this embodiment. It is, however, possible to directly detect the distance between the vehicle 10 and the object by using a distance sensor with radar or the like.

Furthermore, in this embodiment, the pedestrian recognition process unit 24 determined whether the object type is "pedestrian" when two or more image portions presumed to be the images of a pedestrian's leg have been detected within the lower search areas (AREA_3, AREA_4, and AREA_5). It is, however, also possible to search for an image portion having a feature value preset in response to a case where a plurality of pedestrians exist (corresponding to the third image portion of the present invention) and to determine that the object type is "pedestrian" when the third image portion is detected.

Figure 10A:
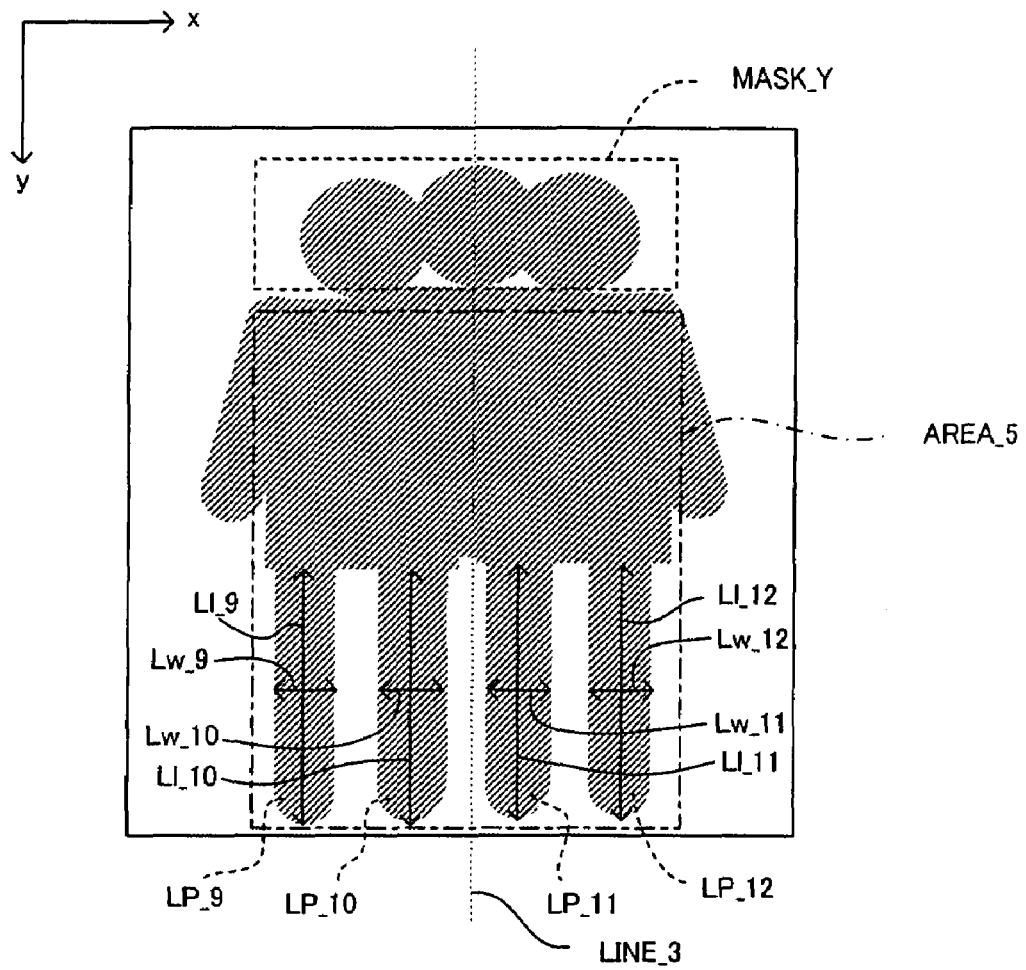
FIG. 10 is an explanatory diagram of a detection process of a legs image of pedestrians.
Figure 10B:
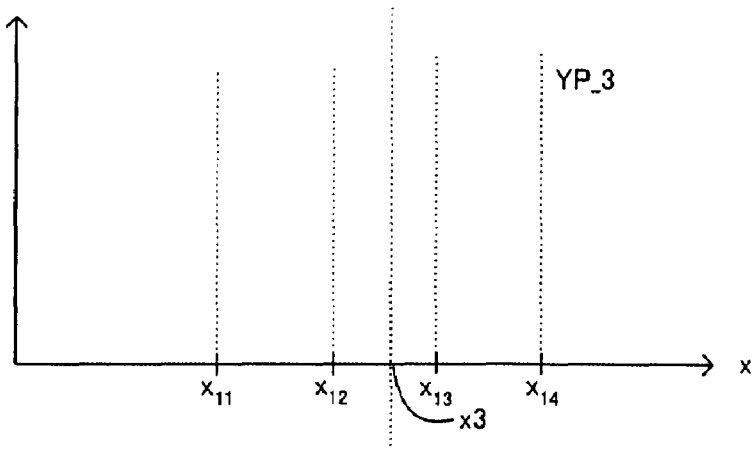

In this instance, for example, it is determined that the object type is "pedestrian" when the image pattern according to the legs of three pedestrians is detected as shown in FIG. 7(b) or when the image portion having the image profile according to the legs of three pedestrians is detected as shown in FIG. 10(a) and FIG. 10(b). The component for searching for the third image portion corresponds to the third image portion search process unit of the present invention. In addition, even if the object type is other than "pedestrian," it is possible to increase the accuracy of object type determination for a plurality of objects by searching for an image portion having a feature value appropriate for a case where a plurality of objects exist.

What is claimed is:

1. A vehicle surroundings monitoring apparatus which monitors the surroundings of a vehicle by using an image captured by a camera mounted on the vehicle, comprising:
   a first image portion extraction process unit which extracts a first image portion likely to be an image of a head of a human in a real space from the captured image;
   a reference mask area setting process unit which sets a predetermined area including the first image portion as a reference mask area in the captured image;
   a comparative mask area setting process unit which sets a left-hand mask area near the left side of the reference mask area and a right-hand mask area near the right side of the reference mask area in the captured image;
   a lower search area setting process unit which sets a lower search area under the reference mask area, the left-hand mask area, and the right-hand mask area in the captured image;
   a second image portion search process unit which searches for a second image portion having a preset feature value corresponding to a leg of a human within the lower search area; and
   an object type determination process unit determines that a type of object in the real space corresponding to the first image portion is "pedestrian" in the case where a luminance difference between the reference mask area and the left-hand mask area is equal to or greater than a first predetermined level and a luminance difference between the reference mask area and the right-hand mask area is equal to or greater than a second predetermined level, wherein
   the object type determination process unit causes the second image portion search process unit to search for the second image portion within the lower search area in the case where the luminance difference between the reference mask area and the left-hand mask area is smaller than the first predetermined level or in the case where the luminance difference between the reference mask area and the right-hand mask area is smaller than the second predetermined level and, in the case where a plurality of the second image portions are detected, it determines that the type of object in the real space corresponding to the first image portion is "pedestrian."

2. A vehicle surroundings monitoring apparatus which monitors the surroundings of a vehicle by using an image captured by a camera mounted on the vehicle, comprising:
   a first image portion extraction process unit which extracts a first image portion likely to be an image of a head of a human in a real space from the captured image;
   a reference mask area setting process unit which sets a predetermined area including the first image portion as a reference mask area in the captured image;
   a real space distance recognition process unit which recognizes a distance between a real space position corresponding to the image portion included in the captured image and the vehicle;
   a comparative mask area setting process unit which sets a left-hand mask area near the left side of the reference mask area and a right-hand mask area near the right side of the reference mask area in the captured image;
   a lower search area setting process unit which sets a lower search area under the reference mask area, the left-hand mask area, and the right-hand mask area in the captured image; and
   a second image portion search process unit which searches for a second image portion having a preset feature value corresponding to a human leg within the lower search area; and
   an object type determination process unit determines that a type of object in the real space corresponding to the first image portion is "pedestrian" in the case where a difference between a reference distance, which is a distance between the real space position corresponding to the first image portion and the vehicle, and a left-hand comparative distance, which is a distance between the real space position corresponding to the image portion of the left-hand mask area and the vehicle, is equal to or greater than a first predetermined distance and in the case where a difference between the reference distance and a right-hand comparative distance, which is a distance between a real space position corresponding to the image portion of the right-hand mask area and the vehicle, is equal to or greater than a second predetermined distance, wherein
   the object type determination process unit causes the second image portion search process unit to search for the second image portion within the lower search area in the case where the difference between the reference distance and the left-hand comparative distance is smaller than the first predetermined distance or in the case where the difference between the reference distance and the right-hand comparative distance is smaller than the second predetermined distance and, in the case where a plurality of the second image portions are detected, it determines that the type of object in the real space corresponding to the first image portion is "pedestrian."

3. A vehicle equipped with the vehicle surroundings monitoring apparatus according to claim 1.

4. A vehicle equipped with the vehicle surroundings monitoring apparatus according to claim 2.

5. A vehicle surroundings monitoring apparatus including an in-vehicle computer having an interface circuit for accessing an image captured by a camera mounted on the vehicle and a non-transitory computer readable medium storing instructions configured to cause the computer to perform a function of monitoring the surroundings of the vehicle, the instructions causing the computer to function as:

a first image portion extraction process unit which extracts a first image portion likely to be an image of a head of a human in a real space from the captured image;

a reference mask area setting process unit which sets a predetermined area including the first image portion as a reference mask area in the captured image;

a comparative mask area setting process unit which sets a left-hand mask area near the left side of the reference mask area and a right-hand mask area near the right side of the reference mask area in the captured image;

a lower search area setting process unit which sets a lower search area under the reference mask area, the left-hand mask area, and the right-hand mask area in the captured image;

a second image portion search process unit which searches for a second image portion having a preset feature value corresponding to a leg of a human within the lower search area; and an object type determination process unit which determines a type of object in the real space corresponding to the first image portion according to whether the second image portion search process unit detects a plurality of the second image portions, wherein the object type determination process unit causes the second image portion search process unit to search for the second image portion within the lower search area in the case where the luminance difference between the reference mask area and the left-hand mask area is smaller than the first predetermined level or in the case where the luminance difference between the reference mask area and the right-hand mask area is smaller than the second predetermined level and, in the case where a plurality of the second image portions are detected, it determines that the type of object in the real space corresponding to the first image portion is "pedestrian."

6. A vehicle surroundings monitoring apparatus including an in-vehicle a computer having an interface circuit for accessing an image captured by a camera mounted on the vehicle and a non-transitory computer readable medium storing instructions configured to operate the computer, the instructions comprising:

a first image portion extraction step of causing the computer to extract a first image portion likely to be an image of a head of a human in a real space;

a reference mask area setting step of causing the computer to set a predetermined area including the first image portion as a reference mask area in the captured image;

a real space distance recognition step of causing the computer to recognize a distance between a real space position corresponding to the image portion included in the captured image and the vehicle;

a comparative mask area setting step causing the computer to set a left-hand mask area near the left side of the reference mask area and a right-hand mask area near the right side of the reference mask area in the captured image;

a lower search area setting step of causing the computer to set a lower search area under the reference mask area, the left-hand mask area, and the right-hand mask area in the captured image;

a second image portion search step of causing the computer to search for a second image portion having a preset feature value corresponding to a leg of a human within the lower search area; and an object type determination step of causing the computer to determine a type of object in the real space corresponding to the first image portion according to whether a plurality of the second image portions are detected in the second image portion search step, wherein the object type determination process unit causes the second image portion search process unit to search for the second image portion within the lower search area in the case where the difference between the reference distance and the left-hand comparative distance is smaller than the first predetermined distance or in the case where the difference between the reference distance and the right-hand comparative distance is smaller than the second predetermined distance and, in the case where a plurality of the second image portions are detected, it determines that the type of object in the real space corresponding to the first image portion is "pedestrian."

* * * * *